Patented Sept. 15, 1953

2,652,338

UNITED STATES PATENT OFFICE 2,652,338

PREPARATION OF CERAMIC BODIES FOR PLASTIC FORMING

Herbert H. Greger, Rockville, Md.

No Drawing. Application May 13, 1952,
Serial No. 287,589

12 Claims. (Cl. 106—39)

This invention relates to the preparation of ceramic bodies for plastic forming.

When ceramic mixtures are prepared for forming into articles of desired shapes, the ingredients after weighing are either dry or wet mixed to obtain blending and homogeneity. In some cases, a slip is formed which is thickened and excess water is removed in various manners including filter pressing. Often it is necessary to subject the filter pressed material to vacuum extrusion to effect deaeration thereof. In some instances, a partial drying or seasoning step is interposed between the steps of filter pressing and vacuum extrusion.

In spite of the deaeration treatment, the usual plastic molding body still has a more than desirable shrinkage. The usual shrinkage of clay-flint-spar bodies is of the order of 12–13 percent.

The above described steps are cumbersome and expensive, and when an adhesive such as acid aluminum phosphate is contained in the mixture to form a ceramic body, this may adhere to metal parts of the equipment.

An object of this invention is to provide a method of preparing ceramic bodies for plastic forming which avoids the prior art disadvantages.

Another object of this invention is to provide a method of preparing ceramic bodies practically free of air and gases without subjecting the bodies to a deaerating treatment.

A further object of this invention is to provide a method of preparing ceramic bodies for plastic forming by first producing a dispersion or mixture of finely divided ceramic material in a water immiscible organic suspending liquid and then adding an aqueous medium such as water or aqueous solutions to the dispersion to displace the water-immiscible liquid and separating the water-immiscible liquid from the resulting mass.

Still another object of this invention is to provide a method of preparing ceramic bodies for plastic forming by first producing a dispersion or mixture of finely divided ceramic material in a water immiscible organic liquid and then adding an air setting bonding agent such as acid aluminum phosphate or an alkali metal silicate in an aqueous medium to the dispersion to displace the water-immiscible liquid and subsequently separating the water-immiscible liquid from the resulting mass.

Other objects will appear in the following description.

In carrying out the present invention, the solid ingredients of the ceramic body are first weighed out and charged to a mechanical mixer, for example, a Lancaster or Simpson mixer which are both fitted with mullers and plows. To these dry materials is added a water immiscible organic liquid which may be a light hydrocarbon oil, for example, kerosene, and then a thorough dispersion and blending accomplished in the mixer.

After mixing is complete, the aqueous phase is added. Through agitation in the mixer and the preferential wetting properties of the ingredient, the oil is displaced from the surface of the ceramic particles. The result is that these ceramic particles become agglomerated in the aqueous phase and become thoroughly blended with it by further mixing.

The water immiscible organic liquid, which in this particular instance, is kerosene and which is displaced by the aqueous medium, remains in the mixing vessel and may be poured off and reused.

The ceramic mass emerges from this mixing operation, either in a granulated form or as plastic lumps, depending on the amount of aqueous phase present. It has been found that the lower the content of the aqueous phase is, the smaller are the granules that form and the lower is their plasticity. When plastic lumps form, then the water content is on the high side, and the plasticity is correspondingly high.

As an example, a white ware body was prepared containing clay, feldspar and flint by following the procedure hereinafter described:

The respective parts by weight of the ingredients were clay 25, feldspar 40, flint 35. These were suspended in kerosene in the ratio of about 4 pounds of solids per gallon of kerosene by mechanically mixing in a mixer of the afore-mentioned type. One-half gallon of kerosene to 4 pounds of solids forms a fairly stiff slip and in some respects, may be preferable as less volume is involved. One gallon of kerosene to 4 pounds of solids forms a relatively thin slurry depending on particle size.

The relative proportions of organic liquid such as kerosene and ceramic material may vary widely. There should always be enough organic liquid to keep the powdered material submerged. Any organic liquid in excess of this is surplusage.

The quantity of aqueous medium used should be such as will form a body of the desired plasticity and, of course, depends upon the nature of the ceramic material and its particle size.

After thorough blending, the aqueous phase was added and comprised for this example a solution of acid aluminum phosphate containing 45% solids and having an $Al_2O_3$ to $P_2O_5$ ratio of 1.2 to 3.

Upon further mixing in the mixer, the aqueous phase displaced the kerosene and granulated particles or plastic lumps of the ceramic material and aqueous phase were formed. In this example, 21 parts of the acid aluminum phosphate solution were used per 100 parts of dry solids (—325 mesh).

In some instances, it is desirable to use an alkali metal silicate solution as a binder in a ceramic mix. When such is the case, a solution of an alkali metal silicate such as sodium or potassium silicate in an aqueous medium may be incorporated according to the present invention by first mixing the solid portions of the mix with a water immiscible organic liquid and subsequently displacing the organic liquid with an alkali metal silicate solution. Even the concentrated commercial solutions of alkali metal silicates have been used successfully. Here again, mixing is continued until homogeneity is assured and the kerosene or other organic water immiscible liquid is freed.

The quantity of acid aluminum phosphate or other binder in water may vary from none at all up to a quantity which will form a viscous solution or suspension but which will still provide enough water in the final mixture to impart the desired plasticity to the body for subsequent forming.

As another example, a Hotel China body was prepared containing about 50 per cent clay substance, 50% flint and feldspar. This was first dispersed in kerosene, then water added and mixed until the kerosene was displaced by the water and the ceramic material agglomerated. About 23 parts of water for 100 parts of powdered ceramic material was used. The material was compacted by extrusion and molding was completed in a press.

The present invention is applicable to the preparation of many mixes of substances with an aqueous medium by first mixing the substances with a water immiscible organic suspending liquid and then displacing the organic liquid with an aqueous medium.

Materials that are insoluble in an aqueous medium and which may be first mixed with an organic suspending liquid immiscible with an aqueous medium and have a preferential affinity for an aqueous medium over an organic liquid immiscible with water and that are suitable for carrying out the present invention are, for example, the following:

$ZrO_2$, $ZrSiO_4$ (zircon), $CaSiO_3$ (wollastonite), $TiO_2$, $Cr_2O_3$, chromite, $B_2O_3$, $Al_2O_3$, $MnO_2$, $Al(OH)_3$, $Al_2O_3.xSiO_2$ (aluminum silicates), kaolin and other clays, $SiO_2$ (quartz), $Pb_3O_4$, (lead oxides), $SnO_2$, $ThO_2$, $Fe_2O_3$, $Fe_3O_4$, $CO_2O_3$, NiO, Ca. phosphates (bone ash, phosphate rock, appetite), spinels, stannates, mixed silicates, feldspars, pyroxenes, micas, Mg-silicates, talc, tremolite, diopside, fosterite, olivine; siliceous frits, calcined clay, $CaCO_3$, $SrCO_3$, $BaCO_3$, $MgCO_3$, MgO, alkali metal titanates, stannates, $CaF_2$, SiC (silicon carbide), TiC, titanium carbide, metal powders such as cobalt, iron, nickel, aluminum, magnesium, silicon.

Any of the above materials should, of course, be powdered and have a particle size small enough to form a suspension in the organic liquid and in the aqueous medium. The particle size may vary considerably. Some materials will be readily suspended in the liquid when the particle size is about 100 mesh. Most whiteware raw materials are usually less than 200 mesh and often less than 325 mesh (42 microns) and smaller. For the fabrication of some pure oxide shapes or refractory porcelains a particle size of less than 5 microns is essential as otherwise bonding through recrystallization does not take place. Quite obviously, the particle size within the limits of operability will vary for different materials and no fixed values can be given. It is only necessary that the particle size be small enough so that the material will be suspended in the organic liquid.

While clay is widely used as a plasticizer in ceramics, it is not essential to the present process. Other plasticizers which may be part of the aqueous phase may be used as part of or in place of clay. For example, starch was used as a hydrolized jelly containing 20 to 25% dry starch, the rest being water. This jelly was prepared by boiling and about 3% boric acid was added to prevent spoiling. This small quantity of boric oxide is a desirable flux in most whiteware bodies.

Other plasticizers such as gum arabic solution, dextrine, methocel and the like, which in most cases will act as a temporary binder and which will burn out at low temperatures are suitable.

The quantity of starch or other plasticizer used may vary widely from none at all up to quantities deemed necessary to impart desired plasticity to the mix. Generally 10 to 100 parts of starch jelly per 1,000 parts of dry ceramic ingredients are used.

Starch paste of 20 to 25% starch content and diluted with an equal part of water will agglomerate finely divided zirconia or zircon and the like and form a plastic body when particle size is 5 microns or less.

The organic liquids immiscible with water or an aqueous medium found suitable for carrying out the process of this invention include liquid paraffine hydrocarbons ranging from low boiling fractions such as gasoline up to fuel oil and including kerosene and mineral spirits, liquid aromatic hydrocarbons such as toluene, xylene, decalene and tetralene, chlorinated liquid aliphatic hydrocarbons such as carbon tetrachloride, and turpentine.

The aqueous medium useful in carrying out the present invention includes, water; aluminum phosphate solutions; sodium, potassium silicate solutions; solutions of phosphoric, oxalic, boric, sulphuric acids, etc.; alkaline solutions of sodium-potassium carbonate, hydroxide, borate; neutral salt solutions of most any water soluble salt.

The aqueous phase may be composed of most any aqueous solution of acidic, basic or neutral non-emulsifying compounds. Such solutions will precipitate through mechanical agitation the hydrophillic ceramic materials from their suspensions in water immiscible organic liquids.

Restrictions are imposed also by chemical compatibility, for example, when the ceramic body mixture contains carbonates, the aqueous phase should not be acidic and react with the carbonates. In such a case, the aqueous phase should be basic or neutral. Further, the composition of the aqueous phase should be so chosen that it will not be detrimental to the ceramic piece during its various stages of processing. For example, sulphate and chloride solutions can be used if these fully decompose before vitrification sets in during firing, otherwise, bloating will occur. Some solutions, such as the phosphates and silicates after reaching the calcining stage, become constituents of the ceramic body. In many instances, either the cation or the anion of the compound may decompose and volatilize leaving either one or the other to become a constituent of the ceramic body as a major component or merely as a minor component, for example, as a stain.

Various other substances can be incorporated in the mix by including the substance in the aqueous medium. Body stains, for example, can be introduced very effectively in this manner.

This method of dispersing the solid in a water immiscible organic liquid has the additional advantage of eliminating air from the powdered solid. When subsequently the agglomeration proceeds under a blanket of the organic liquid or oil, the air remains excluded and the plastic ceramic mass does not need to undergo the expensive deaering type of extrusion.

A small quantity of the kerosene or organic liquid remains dispersed in the agglomerated body, but this small quantity of organic liquid is desired in some molding procedures. The bulk of the organic liquid may be drained off by gravity or in a centrifuge, and the agglomerates may be used as they are as the charge for molding.

In the event consolidated and preformed patties are desired, the whole charge in the mixer is conveyed to an extruder where an effective separation of the excess organic liquid from the ceramic body takes place while this is being compressed and compacted. An overflow may be provided on the hopper of the extruding machine for the oil to drain off for return to storage.

By extruding in this manner a residual kerosene or organic liquid content of about 2 to 6 per cent was obtained and this is in the desirable range for forming the plastic body in molds.

Another method of treating the mass after mulling is to position the material of the mass between two layers of material such as canvas and then to pass the material while between the layers of fabric through a pair of rolls spaced apart a distance equal to about the thickness of molding patties to be formed.

This treatment rolls out the material to a desired thickness for the formation of patties and reduces the oil content to about 1–3%.

A great advantage of this method is that vacuum deaeration is eliminated as a separate step and especially the whole cumbersome wet processing and blending is eliminated. The principal piece of equipment for preparing the ceramic body is, therefore, a suitable mechanical mixer. In addition, there may be needed an extruding machine if a consolidated mass is needed as charge blanks for the forming press.

The present process is of considerable importance. It permits processing of very stiff or highly viscous bodies where deaering in a pug mill becomes difficult. Very finely divided air is not too readily removed by vacuum when the body is stiff and tough. It is much easier to remove the excess of kerosene than an excess of finely dispersed air.

Mixing is done under a blanket of kerosene or other suitable organic liquid, thus preventing the beating of air into the body.

Kerosene and the other organic liquids act as a very desirable lubricant during mixing, especially if relatively "short" low clay bodies.

The usual shrinkage of clay-flint-spar bodies is 12 to 13 per cent. This process partly through its adaptability to lower clay contents, partly through the effects of the process itself showed considerable reduction of shrinkage. With a body containing 25 per cent clay substance, mostly kaolin, the total shrinkage was as low as 4.5 to 6 per cent. This low shrinkage has the enormous advantage of reducing warpage and losses due to cracking, but also permits faster firing schedules which result in an increased output with the same equipment.

The kerosene or other organic liquid has also the additional advantage that its presence in the ceramic body while this passes through the mixer and the extruder has a definite lubricating action, it protects the metal parts to a large extent, and minimizes metal pickup by the ceramic material. Sticking of the mix to various parts of the equipment is also avoided.

Also, small portions of kerosene or other organic liquid in the mix prevents to a considerable degree sticking of the bodies to the molds, even when highly adhesive binders such as aluminum phosphate are used in the mix, by expelling some lubricant from the plastic mixture during molding.

I claim:

1. A method of preparing a ceramic body for molding comprising mixing dry ceramic material having wetting properties preferential to water over a water immiscible organic liquid with said liquid to form a slurry, adding an aqueous medium to said slurry, agitating the mixture until the aqueous medium has displaced in water immiscible liquid in the slurry, and separating the mass of ceramic material and aqueous medium from the water immiscible liquid.

2. A method of preparing a moldable ceramic mass comprising mixing dry ceramic material, in powder form and having wetting properties preferential to water over a liquid hydrocarbon, with said liquid hydrocarbon to form a slurry, adding an aqueous medium to the slurry agitating the mixture until the aqueous medium has displaced the hydrocarbon liquid, in the slurry, and separating the displaced hydrocarbon liquid from the mixture.

3. A method of preparing a moldable ceramic mass comprising mixing dry ceramic material, in powder form and having wetting properties preferential to water over kerosene, with kerosene to form a slurry, adding an aqueous medium to the slurry, agitating the mixture until the aqueous medium has displaced the kerosene in the slurry, and separating the displaced kerosene from the mixture.

4. A method of preparing a moldable ceramic mass comprising mixing dry ceramic material, in powder form and having wetting properties preferential to water over a liquid hydrocarbon, with said liquid hydrocarbon to form a slurry, adding a bonding material in an aqueous medium to the slurry, agitating the mixture until the aqueous medium has displaced the hydrocarbon liquid, in the slurry, and separating the displaced hydrocarbon liquid from the mixture.

5. A method of preparing a moldable ceramic mass comprising mixing dry ceramic material, in powder form and having wetting properties preferential to water over a liquid hydrocarbon, with said liquid hydrocarbon to form a slurry, adding a solution of acid aluminum phosphate in an aqueous medium to the slurry, agitating the mixture until the aqueous medium has displaced the hydrocarbon liquid, in the slurry, and separating the displaced hydrocarbon liquid from the mixture.

6. A method of preparing a moldable ceramic mass comprising mixing dry ceramic materials, in powder form and having wetting properties preferential to water over a liquid hydrocarbon, with said liquid hydrocarbon to form a slurry, adding a solution of an alkali metal silicate in an aqueous medium to the slurry, agitating the mixture until the aqueous medium has displaced the hydrocarbon liquid, in the slurry, and separating the displaced hydrocarbon liquid from the mixture.

7. A method of preparing a moldable ceramic mass comprising mixing dry ceramic material, in powder form and having wetting properties preferential to water over kerosene, with kerosene to form a slurry, adding a bonding material in an aqueous medium to the slurry, agitating the mixture until the aqueous medium has displaced the kerosene in the slurry, and separating the displaced kerosene from the mixture.

8. A method of preparing a moldable ceramic mass comprising mixing dry ceramic material, in powder form and having wetting properties preferential to water over kerosene, with kerosene to form a slurry, adding a solution of acid aluminum phosphate in an aqueous medium to the slurry, agitating the mixture until the aqueous medium has displaced the kerosene in the slurry, and separating the displaced kerosene from the mixture.

9. A method of preparing a moldable ceramic mass comprising mixing dry ceramic material, in powder form and having wetting properties preferential to water over kerosene, with kerosene to form a slurry, adding a solution of an alkali metal silicate in an aqueous medium to the slurry, agitating the mixture until the aqueous medium has displaced the kerosene in the slurry, and separating the displaced kerosene from the mixture.

10. A method of preparing a ceramic body for molding comprising mixing dry ceramic material having wetting properties preferential to water over a water immiscible organic liquid with said liquid to form a slurry, adding a bonding material in an aqueous medium to said slurry, agitating the mixture until the aqueous medium has displaced the water immiscible liquid in the slurry, and separating the mass of ceramic material and aqueous medium from the water-immiscible liquid.

11. A method of preparing a ceramic body for molding comprising mixing dry ceramic material having wetting properties preferential to water over a water-immiscible organic liquid with said liquid to form a slurry, adding a solution of acid aluminum phosphate in an aqueous medium to said slurry, agitating the mixture until the aqueous medium has displaced the water-immiscible liquid in the slurry, and separating the mass of ceramic material and aqueous medium from the water-immiscible liquid.

12. A method of preparing a ceramic body for molding comprising mixing dry ceramic material having wetting properties preferential to water over a water immiscible organic liquid with said liquid to form a slurry, adding a solution of an alkali metal silicate in an aqueous medium to said slurry, agitating the mixture until the aqueous medium has displaced the water-immiscible liquid in the slurry, and separating the mass of ceramic material and aqueous medium from the water-immiscible liquid.

HERBERT H. GREGER.

No references cited.